Dec. 20, 1955                F. A. W. LEFFER                 2,727,813
          PRODUCTION OF COMBUSTIBLE GAS FROM HYDROCARBONACEOUS
                 SOLIDS, PARTICULARLY BITUMINOUS COALS
                         Filed May 31, 1951

INVENTOR:
FREDERICK A. W. LEFFER

United States Patent Office 2,727,813
Patented Dec. 20, 1955

2,727,813

PRODUCTION OF COMBUSTIBLE GAS FROM HYDROCARBONACEOUS SOLIDS, PARTICULARLY BITUMINOUS COALS

Frederick A. W. Leffer, Riverside, Ill., assignor to Universal Oil Products Company, Chicago, Ill., a corporation of Delaware Application May 31, 1951, Serial No. 229,232

9 Claims. (Cl. 48—197)

This invention relates to an improved process for producing a combustible gas or synthesis gas from solid hydrocarbonaceous materials, particularly bituminous coals, however, the improved processing method may be utilized in connection with tar sands, oil shale and the like.

While there are various continuous methods for producing combustible gases from solid hydrocarbonaceous material, most of the known operations do not effectively utilize the entire carbon content of the charge to produce the desired gases as well as auxiliary energy in a thermally efficient manner. For example, unless a gaseous mixture of hydrogen and carbon monoxide, such as synthesis gas, may be produced at a low cost, then synthetic hydrocarbon materials ultimately produced cannot readily compete with the corresponding products produced in present day practice from mineral oil sources.

It is thus a principal object of the present invention to provide a combustible gas, or synthesis gas, in a continuous operation providing for the utilization of substantially all the potential heat energy of the solid hydrocarbonaceous charge material, as well as using to advantage the heat of resulting product streams to provide an overall thermally efficient operation.

Additional objects and advantageous features of the present invention are set forth in subsequent portions of the specification.

The present invention provides in a broad embodiment a method for producing combustible gas from solid hydrocarbonaceous material, in a manner which comprises, introducing a particulated stream of this solid material into a confined distillation zone and into contact therein with a heat-supplying gas mixture containing superheated steam and a minor amount of free oxygen and carbonizing and destructively distilling the solid material therein at a carbonizing temperature with formation of carbonized particles and a gasiform distillation product substantially devoid of free oxygen, passing the carbonized particles from the distillation zone and a recycle stream of heated particles of lower carbon content into a confined gas producing zone, continuously introducing the gasiform distillation product from the distillation zone and a high temperature combustion gas substantially devoid of free oxygen into contact with the particles in the gas producing zone and therein reacting a portion of the carbon on the particles and the gaseous materials at a carbon-steam reaction temperature substantially higher than the aforesaid carbonizing temperature with formation of a combustible gas comprising carbon monoxide and hydrogen, recovering this combustible gas and continuously passing resultant particles of lowered carbon content from the gas producing zone into a confined particle heating zone, introducing an oxidizing gas into the heating zone and burning a portion of the carbon on the particles therein at a temperature substantially above the aforesaid carbon-steam reaction temperature with generation of a hot gaseous combustion product substantially devoid of free oxygen, continuously passing a stream of the resulting highly heated residual particles from the heating zone as the aforesaid recycle stream to the gas producing zone and thereby providing a portion of the endothermic reaction heat required within the gas producing zone, and supplying another portion of this endothermic reaction heat by introducing a stream of the hot gaseous combustion product from the heating zone as the aforesaid high temperature combustion gas into the gas producing zone.

In a preferred mode of operation, a portion of the residual carbon-containing particles from the heating zone is continuously passed therefrom into a final burning zone and therein the carbon is substantially completely burned from the particles in the presence of an excess of free oxygen at a temperature substantially above the carbonizing temperature maintained in the distillation zone, the resulting high temperature combustion gases containing free oxygen are withdrawn from the final burning zone and at least a portion thereof is commingled with superheated steam to form the heat-supplying gas mixture being introduced into contact with the particles in the distillation zone. In this preferred mode of operation the overall thermal efficiency may be enhanced by transferring heat from the highly heated carbon-free ash-like material, which is formed in and continuously discharged from the final burning zone, to an oxygen-containing gas stream to be supplied, at least in part, to the final burning zone, the last-mentioned gas stream being thereby preheated prior to its use for furnishing the free oxygen for the burning or oxidation reactions of the operation. In a specific mode of bringing about this heat transfer, the hot ash-like residual material is continuously discharged from the final burning zone into a separate confined quenching zone wherein it is brought into direct contact with a low temperature aqueous stream and low pressure steam is generated thereby, a stream of this low pressure steam is passed in indirect heat exchange relationship with air or other free oxygen-containing gas, and resultant preheated oxygen-containing gas is introduced into contact with the particles in the final burning zone, while the cooled carbon-free ash-like material is discharged from the quenching zone as an aqueous slurry stream. This manner of operation facilitates continuous elimination of the carbon-free ash from the system and precludes the return of any substantial amount of this ash to the distillation, gas producing, and particle heating zones.

It is also a feature of the present improved method to pass the hot combustible gas product stream from the gas producing zone in indirect heat exchange with an aqueous stream and thereby provide high temperature superheated steam which is utilized in the heat-supplying gas mixture being contacted with the particles in the distillation zone as set forth in the broad embodiment. It is not intended to limit, however, the method of heat exchanging the combustible gas product stream with the aqueous stream, for example, tubular type heat exchanging apparatus may be used, or alternatively, an indirect heat exchange may be effected in a "pebble heater" arrangement, wherein a solid heat retentive granular or spheroidal inert solid is maintained in cyclic circulation through a heat absorbing zone and a heat dissipating zone with passage of the hot combustible gas stream over the particles countercurrently in the heat absorbing zone, while water or low temperature steam is passed countercurrently through the heat retentive material in the heat dissipating zone and thereby transformed into high temperature superheated steam.

Generally, a major portion of the total heat requirement of the gas producing zone is furnished thereto by the hot recycle stream of particles passing from the heating zone into admixture with the carbonized material passing from the distillation zone, while a minor portion of the heat requirement is supplied by the stream of hot combustion gas introduced from the heating zone, preferably at substantially its temperature of discharge from the latter. The total heat requirement for the gas producing zone is kept at a minimum by introducing the gasiform distillation product stream into the gas producing zone at substantially the temperature at which it is discharged from the distillation zone.

The heat required for the destructive distillation and carbonization of the solid material in the distillation zone is furnished therein preferably entirely by the gasiform materials introduced thereto. Thus, in a preferred mode of operation in accordance with the present invention, a portion of the heat requirement is furnished as sensible heat by the introduction of high temperature superheated steam together with a combustion gas stream while the latter is at substantially the temperature of its withdrawal from the final burning zone, and therefore at a substantially higher temperature than that in the distillation zone and the balance of the heat requirement is generated in the distilling zone itself by the controlled combustion reactions effected through the free oxygen contained in the hot combustion gas supplied from the final burning zone to the distilling zone or in the total gas mixture supplied to the latter zone. An excess of oxygen is passed to the final burning zone so that the resulting combustion product stream has a residual free oxygen content which may range from 2.5 to 10% by volume of the combustion gas. The stream of hot combustion gas passing from the final burning zone to the distillation zone is admixed with a substantial amount of high temperature superheated steam; generally the proportion of steam to combustion gas is such that the free oxygen content of the total gas mixture introduced into contact with the hydrocarbonaceous particles in the distillation zone does not exceed 7.5% by volume and preferably is within the range of from 1 to 4%. The distilling and carbonizing of the comminuted solid charge is accomplished in the present process preferably in the absence of added extraneous or recirculated solid materials, consequently, an appreciably smaller quantity of gas is required for effectively and uniformly contacting the solid particles in the confined distillation zone, than would otherwise be required for maintaining a uniform contacting of a mixture of charge and added solids flowing through the distillation zone, or for maintaining charge particles and added solid particles in a fluidized state when utilizing the fluidized contacting technique.

In the improved operation provided by this invention, the burning and heating of the particles in the confined heating zone is effected by a gasous stream of controlled free oxygen content contacting the solid particles continuously as they are introduced thereto from the gas producing zone. The carbon content of the particles intentionally is not entirely burned and removed therefrom by the oxidizing gas stream, and a substantially oxygen-free combustion gas is discharged from the heating zone, while a portion of the particles with a residual carbon content passes from the heating zone to the final burning zone. The controlled oxygen content oxidizing stream which is introduced into the heating zone preferably comprises a stream of the hot combustion gas issuing from the final burning zone and containing unused oxygen, as already described, and air or oxygen may be added to this combustion gas stream to impart to the oxidizing gas stream being introduced into the heating zone the appropriate amount of free oxygen required for the incomplete carbon combustion therein.

The temperature within the oxidative and destructive distillation zone, into which the fresh charge is introduced, is maintained in the range of from about 800° to about 1400° F. and preferably of the order of about 1025° F. The temperature within the gas producing zone, wherein gasiform hydrocarbons supplied thereto from the distillation zone are cracked and concomitantly therewith a carbon-steam reaction and a carbon dioxide reduction are effected, is maintained at a temperature of from about 1600° to about 1900° F., and preferably of the order of about 1800° F., while the temperature in the heating zone is maintained at a substantially higher range, generally of from about 2000° to about 2400° F., and normally of the order of about 2250° F., depending upon the fusion or agglomeration characteristics of the particular comminuted material. The temperature within the final burning zone may be of the order of 2000° F. or higher, the actual temperature depending again on the characteristics of the solid material undergoing treatment. The oxidation is effected within the final burning zone in a manner to produce a substantially carbon-free ash and at a temperature precluding ash fusion.

By providing the final burning zone in combination with the separate particle heating zone, substantially complete utilization of the carbon content of the charge is obtained, while at the same time incomplete carbon combustion in the heating zone permits higher temperature than would ordinarily be permissible if substantially complete combustion were obtained therein. Thus, by obtaining higher temperatures in the heating zone, resulting higher temperatures can be obtained in the gas producing zone by means of the hot materials supplied thereto from the particle heating zone with a minimum of solids recycled from the latter to the gas producing zone, and the higher temperature thus attained in the gas producing zone considerably accelerates the desired hydrocarbon decomposition reactions and assures the reaction of materially larger proportions of steam, carbon and carbon dioxide to form carbon monoxide and hydrogen, than possible if the gas producing reactions were carried out at a lower temperature level. An unusually high conversion of high carbon dioxide into carbon monoxide is promoted, moreover, by substantially excluding from the gases introduced into the gas producing zone free oxygen which would favor the undesired reverse reaction of carbon dioxide formation. The throughput of the residual particles from the heating zone to the final burning zone normally corresponds substantially to the rate of supply of ash components in the hydrocarbonaceous charge to the distillation zone, so that the rate of discharge of ash from the final burning zone is practically equal to that of the rate of introduction of ash components to the system.

The free oxygen-containing stream being introduced into the final burning zone, and in some cases also in controlled amounts into the heating zone and/or distillation zone, may be air or it may be a gas of higher free oxygen content, such as commercial oxygen or a mixture thereof with air. The oxygen concentration of the oxygen gas charge stream is selected primarily with regard to the heating value, or to the composition of the combustible gas desired as final product, since the use of commercial oxygen or an oxygen-air mixture of higher free oxygen content than air effects a reduction in the nitrogen concentration in the combustible gas product stream.

Further, with a view to the most effective conservation and utilization of heat within the process, the oxygen-containing gas charge stream supplied to the process for the combustion reactions is preferably preheated by indirect heat exchange with the low pressure steam which is generated by quenching the hot ash in the final burning zone with water in a separate confined quenching zone. Additional heat, if necessary, for this purpose may be recovered by bringing a stream of hot combustion gas from the final burning zone into indirect heat exchange with the oxygen or air after it has been preheated, or at the same time as it is being preheated, by the low pressure steam from the quenching zone.

It is not intended to limit the present invention to any one particular means for effecting the contacting of solid particles within each of the confined zones or to but one means for transporting the solid particles from one zone to another and maintain the continuous cyclic flow of particles through the heating and gas producing zones. Uniform and efficient contacting of the particles in each zone may be effected by fluidization thereof with the gaseous stream being introduced to the particular zone, and fluidized transportation of particles may be utilized to move particles from one zone to another. However, gravity flow of material may also be utilized to advantage in effecting the passage of particles in a continuous movement through successive stages of contact, where zones are suitably superimposed, while either mechanical or gas-lift means may be utilized for providing the recycle movement of particles from the heating zone to the gas producing zone.

Reference to the accompanying drawing and the following description thereof will serve to illustrate the present improved continuous gas producing operation, as well as point out still further advantageous features in connection therewith.

Referring now to the drawing, there is indicated a charge line 1, having valve 2, which provides means for introducing comminuted hydrocarbonaceous solid charge material to the distillation and carbonization zone 3. The solid charge material may be comminuted to any suitable size, being preferably of the order of from 50 to 200 mesh where the particles are to be contacted in fluidized beds maintained within each of the contacting zones. However, the particles may be of substantially larger size, of the order from 0.5 to 3 mm. where they are to be contacted as descending moving beds in a gravity flow type of operation. A hot combustion gas stream, containing a small quantity of free oxygen or air and having an appreciably higher temperature than the reaction temperature prevailing in the distillation zone is continuously introduced into the distillation zone 3 by way of line 4, and high temperature superheated steam is introduced into admixture with the oxygen-containing combustion gas stream in line 4 by way of line 5 and control valve 6. This mixed gaseous stream effects oxidative destructive distillation or cracking and carbonization or coking of the hydrocarbonaceous particles within the distillation zone, so as to form coked carbonaceous particles and a gasiform distillation product stream substantially devoid of free oxygen and containing hydrocarbons, steam, and carbon oxides. The reactions within the distillation zone 3 may be effected at a destructive distillation temperature of the order of from 800° to 1400° F., and preferably within the range of from about 1000° to about 1150° F., and the entire heat requirement for the carbonization and destructive distillation is imparted to the solid charge material by the gaseous charge streams brought into contact therewith and by the limited combustion of hydrocarbonaceous components with the oxygen furnished by the gaseous charge.

Resulting carbonized particles are continuously withdrawn from the distillation zone 3 and passed by way of line 7 to a gas cracking and reducing or gas producing zone 8, and the gasiform distillation product stream from the distillation zone 3 is continuously passed through line 9 and control valve 10 into the gas producing zone 8 by way of line 11, through which also a highly heated combustion gas stream devoid of free oxygen is supplied from a heating zone 12. The combustion gas stream thus supplied through line 11 not only participates as reactant in the production of the combustible gas, but also introduces into the gas producing zone 8 a portion, normally a minor portion, of the endothermic heat required for the reactions therein. During the contact of the coked or carbonized particles in zone 8 with the hot gaseous materials supplied thereto, the decomposition of hydrocarbons of the gasiform distillation product stream is brought about simultaneously with the interreaction of hydrocarbon decomposition products, steam, carbon dioxide and a portion of the carbon on the carbonized particles to form a combustible gas comprising carbon monoxide and hydrogen as principal normally gaseous components. The temperature within the gas producing zone 8 is maintained at a substantially higher temperature than that maintained within the distillation zone 3, and is generally within the approximate range of 1600°–1900° F., and preferably of the order of 1800° F. A major portion of the endothermic heat requirements for the gas producing reactions within zone 8 is supplied by recycled heated carbonaceous particles which have a lower carbon content than the particles supplied from the distillation zone 3 and are circulated from the heating zone 12 by way of line 13 and valve 14 and into admixture with the particles passing in line 7 from the distillation zone into the gas producing zone.

The gas-solids contact in the gas producing zone 8 may be effected in any suitable manner. Preferably, however, the quantities of gasiform distillation product and hot substantially oxygen-free combustion gas introduced into the gas producing zone, relatively to the quantity of solid particles present in this zone, are regulated in such manner that the particles in this zone are maintained in finely divided and freely flowing state, and most advantageously the introduction of the gaseous materials into the gas producing zone is made at such points therein that the particles are maintained in a fluidized dense phase bed.

The contacted particles obtained as solid residue of the gas producing reactions in zone 8 have on the average a carbon content intermediate that of the particle stream introduced through line 7 into zone 8 and of the particle stream being recycled to zone 8 through line 13 from the heating zone 12. The contacted particles are withdrawn from zone 8 in a continuous stream by way of line 15 and valve 16, which in turn introduces them into the oxidative heating zone 12. The particles within the heating zone 12 are subjected to oxidation and burning, however, only an incomplete removal of the carbonaceous matter from the solid particles is effected during their contact in zone 12 with an oxidizing gas stream supplied by way of line 17 and control valve 18. In accordance with a preferred mode of operation of the present invention, the gaseous oxidizing stream entering heating zone 12 is a hot combustion gas stream which has a controlled oxygen content and is supplied from a final burning zone 19. When necessary the oxygen content of the gaseous stream passing from the burning zone 19 through line 17 into the heating zone may be increased by adding air or oxygen supplied by way of line 20 and valve 21, in order to furnish the appropriate amount of oxygen for the desired, incomplete carbon combustion. Line 20 in turn receives the oxygen-containing stream from a suitable source of supply, and preferably in a preheated state.

In the heating zone 12, the temperature is appreciably higher than that maintained within the gas producing zone 8. Heating is effected by burning a portion of the carbon content of the particles with the controlled oxidizing gas stream introduced by way of line 17. The particles within zone 12 may thus be heated to a temperature of from 2000° to 2400° F., and normally to a temperature of the order of 2200° to 2250° F., depending upon the fusion or agglomeration characteristics of the particular comminuted material. The burned and highly heated particles obtained in the heating zone 12 and having a residual carbon content are continuously withdrawn therefrom by way of line 22 and a stream of these particles is discharged through control valve 23 into the final burning zone 19, wherein an oxidizing gas stream having an excess free oxygen content is contacted therewith to effect the substantially complete burning of all carbonaceous matter from the particles. Another stream of the highly heated particles withdrawn from zone 12 by way of line 22 is directed from the latter into line 13 for recirculation to the gas producing zone 8 in the manner already described above.

The final burning zone 19 provides means for producing a substantially carbon-free ash at a temperature precluding ash fusion, and means for assuring the complete utilization of the carbon content of the charge material in a highly effective manner. The oxidizing gas stream being introduced into burning zone 19 by way of line 25 and valve 26 preferably has an excess oxygen content so that there is obtained not only a substantially complete combustion of all carbon content, but also a resulting combustion gas stream which may be discharged through line 17 to the heating zone 12 with a sufficiently high content of free oxygen for effecting the controlled burning and heating of the particles in that zone. The combustion temperature in zone 19 generally is maintained substantially higher than the reaction temperature in the distillation zone 3 and normally is at least about 2000° F. A still higher temperature, up to about 2400° F. is more advantageous, and it is preferred, therefore, to effect the final burning in zone 19 at the highest permissible temperature, such temperature being about 50°–75° F. below the fusion or agglomeration temperature of the solid particles in this zone. When using commercial oxygen or an oxygen-air mixture of a higher free oxygen content than air with a view to producing a combustible gas of low nitrogen content, it may be desirable to admix the oxygen charge gas with a suitable diluent gas of correspondingly low nitrogen content. Thus, excess hot combustion gas issuing from the oxidative heating zone 12 may be directed from line 11 through line 27 and valve 28 into line 25. An excessive temperature rise in zone 19 may be prevented by supplying a controlled amount of the oxygen charge gas in unpreheated state (directly from line 32 and pump or blower 34, and bypassing the heat exchanging zone 35) into line 25 downstream of valve 26. Preferably the several gas streams are so proportioned in the mixture entering through line 25 into the final burning zone 19 that a sufficiently large quantity of gas passes thereto to maintain the particles therein in a finely divided and readily flowing state, for example in a fluidized dense phase bed.

Since the complete combustion of residual carbon is confined to the final burning zone and complete carbon combustion, instead of being attempted within the particle heating zone 12, is precluded in the latter, combustion gases practically devoid of free oxygen may be formed readily in the particle heating zone 12 and thus be made available at high temperature for use both as desirable reactant and as heat supplying medium in the gas producing zone 8. The high temperature combustion gas generated in zone 19 by the substantially complete carbon combustion with an excess of free oxygen, in turn, constitutes both an effective distilling and carbonizing agent as well as a heat-supplying medium for the reactions in the distillation zone. Accordingly, a stream of the combustion gas discharged from the burning zone 19 into line 17 is directed therefrom through line 29 into line 4, containing control valve 62, and then substantially at its temperature of discharge from zone 19 into admixture with superheated steam supplied through line 5, as already described, to be thereupon discharged from line 4 into the distillation zone 3. In some cases, the free oxygen content of the hot combustion gas passing through line 29 into line 4 may be supplemented by the addition of a minor amount of oxygen charge gas from line 36 through valve 37 into line 4 to bring the free oxygen content of the total gas mixture entering the distillation zone 3 to the desired level, generally not more than 7.5 volume percent.

In normal operation, the combustion gas is produced in the final burning zone at a rate in excess of that required in the distillation zone. Accordingly, it is desirable and advantageous to introduce a portion of the combustion gas from the final burning zone 19 directly into the heating zone 12 by way of line 17, at its temperature of withdrawal from the burning zone and to adjust the free oxygen content of the total gas supply to the zone 12 by adding a proper amount of preheated oxygen gas, whenever the free oxygen content of the stream of combustion gas passing from the final burning zone 19 to the heating zone 12 is insufficient for the desired amount of combustion in the latter zone. This oxygen-containing stream, as hereinbefore noted, is introduced by way of line 20 and valve 21 into line 17, and the concentration of free oxygen in the total gas mixture introduced into the particle heating zone 12 is generally less than that of air, and more commonly the free oxygen content is from about 5% to about 15% by volume of the total mixed gas supply to the zone 12, even when commercial oxygen or an oxygen-air mixture is the oxygen charge gas supplied to the process. Air or oxygen is introduced as oxygen charge gas into the system by way of line 32 and valve 33, and the pump or blower 34 which discharges into a heat exchange zone 35. Preheated oxygen charge gas is thus made available for supply to the various points of the system by way of line 36, with this line in turn connecting with the other distributing lines 25, 20 and 4.

In order to maintain a thermally efficient process, as well as to eliminate ash constituents from the processing unit at practically the same rate at which they are introduced into the system by the charge material, a continuous stream of carbon-free hot ash particles is continuously withdrawn from the final burning zone 19 by way of line 38 and introduced into a quenching zone 39. Thus, residual heat may be taken up from the hot ash particles by contact with an aqueous stream with the production of low pressure steam. In the present embodiment, water is introduced by way of pump 40, line 41, and valve 42 into the quenching zone 39, so that there is direct contact in the quenching of the ash material in zone 39; the resultant low pressure steam may be discharged by way of line 43 and valve 44. The water is supplied through line 41 preferably in excess of that required for cooling so that a slurry of cooled ash in water is formed and this slurry is continuously withdrawn from the lower end of the quenching zone 39 by way of line 45 and valve 46.

The low pressure steam passing from the quenching zone 39 is used in the present instance to preheat the air or oxygen charge gas stream which is passed through heat exchanger 35. It may be noted, however, that additional heat for preheating purposes may be recovered by bringing a stream of hot combustion gas from the final burning zone by way of lines 29 and 30, into admixture with the low pressure steam introduced into the heat exchanger 35 by way of line 43. Low pressure waste steam and/or condensed water and cooled combustion gases may be discharged from the heat exchanger by way of line 47 and valve 48.

In an alternative mode of heat utilization, the hot combustible gas stream from the cracking and reducing zone 8 may be passed partly in heat exchange with the air or oxygen charge stream to effect the preheating of the latter, however, in a preferred embodiment, the hot combustible gas stream passes from zone 8 entirely by way of line 49 and valve 50 into a steam superheating zone 51 and from the latter by way of line 52 into a steam generating zone 53, being discharged from the latter in cooled condition by way of line 54 and valve 55. Water is supplied to the steam generating zone 53 by way of line 41, line 56 and valve 57, while resulting high pressure steam passes to zone 53 by way of line 58 into the high pressure steam superheating zone 51. Indirect heat exchange is provided within each of the exchange zones and resulting high pressure high temperature superheated steam passes from the zone 51 by way of line 5 and valve 6 into line 4 where it is introduced into the destructive distillation zone 3 as hereinbefore set forth. In this manner, the superheated steam is readily obtained at a temperature appreciably higher than the destructive distillation and carbonizing temperature in zone 3 and thus serves, upon its supply at practically undiminished temperature to zone 3, both as distilling agent and heat supplying medium together with the combustion gas supplied to this zone, in addition to subsequently participating by its reaction with carbon in the zone 8 in the production of the combustible gas therein. Excess steam may be withdrawn from the system by way of withdrawal line 59 having valve 60.

In the event that the production of combustion gas within particle heating zone 12 reaches a rate in excess of that required for supply to the gas producing zone, the excess may be directed into the final burning zone by way of line 27, as a component of the total gas supply to the latter and thereby utilizing the combustible components, such as carbon monoxide that may be present in small amounts in the excess gas, for generation of heat in the final burning zone. Also, any resulting excessive combustion gas from the final burning zone not required in either the distillation zone 3 or the particle heating zone 12 may be discharged from the processing unit through line 29 and valve 61, or alternatively used within suitable heat recovery units, such as the oxygen gas preheating exchanger 35, as already described.

Although not shown in the present diagrammatic drawing, high pressure superheated steam from line 59 or other suitable aerating or stripping medium may be utilized for aerating and/or stripping the solid particles as they pass from one contacting zone to another, so that undue compacting of the solid particles during their flow through transfer passageways of restricted cross-section may be precluded and adsorbed or occluded vapors and gaseous materials may be substantially stripped from the particles prior to entering another confined zone, particularly where such occluded gaseous materials may be of a contaminating nature.

The various contacting zones in the present combustible gas producing method may be maintained under any suitable pressure, and the pressures need not be the same in the several separate contacting zones. Advantageously, however, the distillation zone 3, the combustible gas producing zone 8, the oxidative heating zone 12 and the final burning zone 19 are operated at substantially the same general pressure level with only such minor pressure differences between these zones as are required to maintain the desired flow of materials within the system. Such general pressure level may vary from subatmospheric to 200 p. s. i., or higher, and preferably is at least sufficiently above atmospheric pressure to permit controlled discharge of the various product gas stream and particularly of the cooled combustible gas from the system without the aid of vacuum or exhaust pumps. Pressures of the order of 50–75 p. s. i. are generally preferred in the zones 3, 8, 12 and 19. The pressure in the quenching zone 39 is advantageously maintained slightly lower than in the burning zone 19. The pressure on the steam sides in the high pressure steam generating zone 53 and high pressure steam superheating zone 51 normally is maintained from about 15 to about 50 p. s. i. higher than the pressure in the distillation zone 3.

I claim as my invention:

1. A continuous method for producing combustible gas from solid hydrocarbonaceous material, which comprises, introducing said material as comminuted particles into a confined distillation zone and therein contacting said particles with a high temperature gas mixture of superheated steam and hot combustion gases having a minor content of free oxygen to convert said hydrocarbonaceous material at carbonizing temperature by oxidative and destructive distillation into carbonized particles and a gasiform distillation product substantially devoid of free oxygen, continuously introducing carbonized particles from said distillation zone and heated recycle particles of lower carbon content into a confined gas producing zone, separately and continuously discharging said gasiform distillation product from said distillation zone and introducing it into said gas producing zone in admixture with a hot combustion gas stream obtained as hereinafter set forth, contacting the particles within said gas producing zone with the mixed gaseous materials therein at a reducing and carbon-steam reaction temperature substantially higher than said carbonizing temperature and thereby producing a combustible gas containing carbon monoxide and hydrogen, passing the resulting contacted particles of lowered carbon content from said gas producing zone to a confined heating zone and therein contacting said particles continuously with an oxidizing gas stream of controlled free oxygen content, effecting the controlled partial burning of the carbonaceous matter from said particles within said heating zone at a higher temperature than said carbon-steam reaction temperature with the formation of a highly heated gaseous combustion product substantially devoid of free oxygen, continuously withdrawing and passing a portion of the resulting highly heated residual carbon-containing particles from said heating zone as said heated recycle particles to said gas producing zone, withdrawing said gaseous combustion product from said heating zone and continuously introducing a stream thereof in still highly heated state into said gas producing zone as said hot combustion gas stream, passing a separate stream of said residual carbon-containing particles from said heating zone into a confined final burning zone and therein burning the carbon substantially completely from the particles in the presence of an excess of free oxygen at a temperature substantially above said carbonizing temperature, withdrawing resulting high temperature combustion gases containing free oxygen from said final burning zone and commingling at least a portion thereof as said hot combustion gases with superheated steam to form said high temperature gas mixture being introduced into said distillation zone, and continuously withdrawing said combustible gas from said gas producing zone and recovering the same.

2. The method of claim 1 further characterized in that a portion of the heat required for the oxidative and destructive distillation reaction within said confined distillation zone is provided by the sensible heat of said high temperature gas mixture of superheated steam and hot combustion gases and the remaining heat required for said oxidative and destructive distillation reaction is generated within said distillation zone by reaction of the free oxygen content of said gas mixture, said free oxygen content amounting to not more than 7.5% by volume of said gas mixture.

3. The method of claim 1 further characterized in that said combustible gas stream being continuously discharged from said gas producing zone is passed in indirect heat exchange relationship with an aqueous stream, the latter is thereby transformed into high pressure high temperature superheated steam, and at least a portion of the superheated steam thus produced is admixed with the stream of hot combustion gases being passed from said final burning zone to said distillation zone.

4. The method of claim 1 further characterized in that resulting hot substantially carbon-free ash material is withdrawn from said final burning zone and introduced in still heated state into a confined quenching zone, a low temperature aqueous stream is passed in direct contact with said hot ash-like residue within said quenching zone and low pressure steam is generated therein and withdrawn therefrom while substantially cooled carbon-free ash material is continuously withdrawn from said quenching zone as an ash-slurry stream.

5. A continuous method for producing combustible gas from comminuted solid hydrocarbonaceous material, which comprises, introducing a steam of said comminuted solid material into a confined distillation zone and into countercurrent contact therein at a carbonizing temperature with a hot gaseous mixture of superheated steam and combustion gas having a minor content of free-oxygen and effecting the carbonization of the solid material and the formation of a gasiform distillation product stream substantially devoid of free-oxygen and containing hydrocarbons and steam and carbon oxides, separately withdrawing and passing resulting carbonized particles from said distillation zone and a stream of hot recycle particles of lower carbon content into a gas producing zone and contacting the particles therein with a mixture of said gasiform distillation product stream from said distillation zone and hot combustion gases produced as hereinafter set forth, producing a combustible gas stream mainly comprising carbon monoxide and hydrogen by inter-reacting hydrocarbons and carbon dioxide and steam and a portion of the carbon of the carbonized particles within said gas producing zone at a carbon-steam reaction temperature, discharging said combustible gas continuously from said gas producing zone and passing it in indirect heat exchange relationship with an aqueous stream and thereby transforming the latter into high pressure high temperature superheated steam, passing at least a portion of the superheated steam thus produced into said distillation zone, continuously passing carbon-containing particles from said gas producing zone into a confined particle heating zone, introducing an oxidizing gas stream of controlled free oxygen content into said heating zone and burning a controlled portion of the residual carbonaceous matter from said particles therein at a temperature substantially above said carbon-steam reaction temperature and thereby producing highly heated residual carbon-containing particles and gaseous combustion products substantially devoid of free-oxygen, supplying a stream of said gaseous combustion products at substantially the temperature of their discharge from said heating zone as the aforesaid hot combustion gases directly into said gas producing zone and thereby supplying a portion of the endothermic reaction heat required in said gas producing zone, passing a stream of said highly heated residual carbon-containing particles from said heating zone as said hot recycle particles to said gas producing zone and thereby supplying the remaining portion of the endothermic heat requirement within said gas producing zone, withdrawing a separate stream of residual particles from said heating zone at a rate substantially equivalent to the rate of supply of ash components in the hydrocarbonaceous charge particles and introducing said separate stream into a confined final burning zone, countercurrently passing an oxidizing gas stream having an excess of free oxygen through the particles within said final burning zone and therein producing a hot combustion gas containing free-oxygen by burning the carbon substantially completely from the particles at a temperature above said carbonizing temperature, passing a stream of the last-mentioned combustion gas into admixture with said superheated steam being introduced into said distillation zone to thereby form said hot gaseous mixture of superheated steam and combustion gas, continuously withdrawing the resulting hot carbon-free ash-like material from said final burning zone and transferring heat therefrom to an oxygen-containing gas stream whereby to preheat the latter, and passing at least a portion of the resulting heated oxygen-containing gas stream into said final burning zone as said oxidizing gas stream having an excess of free oxygen.

6. A process for producing combustible gas which comprises destructively distilling solid hydrocarbonaceous material in a distillation zone, passing resultant carbonized solid particles and vaporous distillation products from said zone to a gas producing zone and therein reacting the same at a higher temperature than that in the distillation zone to form a combustible gas, passing solid particles of reduced carbon content from said gas producing zone to a heating zone and therein burning a portion of the carbon from the particles to form heated solid and gaseous products, passing at least a portion of said heated products from the heating zone to the gas producing zone to supply heat for the gas producing reaction in the last-named zone, passing residual solid particles from the heating zone to a final burning zone and therein burning the remainder of the carbon from the particles, and passing resultant hot combustion gases from the final burning zone to said distillation zone to supply heat for the destructive distillation in the distillation zone.

7. The process of claim 6 further characterized in that heated solid products are passed from said heating zone to said gas producing zone.

8. The process of claim 7 further characterized in that heated gaseous products are also passed from said heating zone to the gas producing zone.

9. A method for producing combustible gas from solid hydrocarbonaceous material, which comprises, introducing a particulated stream of said solid material into a confined distillation zone and into contact therein with a heat-supplying gas mixture containing superheated steam and a minor amount of free oxygen and carbonizing and destructively distilling said material therein at a carbonizing temperature with formation of carbonized particles and a gasiform distillation product substantially devoid of free oxygen, passing said carbonized particles from said distillation zone and a recycle stream of heated particles of lower carbon content into a confined gas producing zone, continuously introducing said gasiform distillation product from said distillation zone and a high temperature combustion gas substantially devoid of free oxygen into contact with the particles in said gas producing zone and therein reacting a portion of the carbon on the particles and the gaseous materials at a carbon-steam reaction temperature substantially higher than said carbonizing temperature with formation of a combustible gas comprising carbon monoxide and hydrogen, recovering said combustible gas and continuously passing resultant particles of lowered carbon content from said gas producing zone into a confined particle heating zone, introducing an oxidizing gas into said heating zone and burning a portion of the carbon from the particles therein at a temperature substantially above said carbon-steam reaction temperature with generation of a hot gaseous combustion product substantially devoid of free oxygen, continuously passing a stream of the resulting highly heated residual particles from said heating zone as said recycle stream to said gas producing zone, passing another stream of said residual particles from the heating zone to a final burning zone and therein burning the remainder of the carbon from the particles, and passing resultant hot combustion gases from the final burning zone to said distillation zone to supply heat for the carbonization and destructive distillation in the last-named zone.

References Cited in the file of this patent
UNITED STATES PATENTS

| | | |
|---|---|---|
| 1,116,216 | Berry | Nov. 3, 1914 |
| 1,791,411 | Hillebrand | Feb. 3, 1931 |
| 1,861,452 | Rusby et al. | June 7, 1932 |
| 1,938,139 | Ekelund | Dec. 5, 1933 |
| 1,964,877 | Hereng | July 3, 1934 |
| 2,527,575 | Roetheli | Oct. 31, 1950 |
| 2,534,728 | Nelson et al. | Dec. 19, 1950 |
| 2,554,263 | Nelson | May 22, 1951 |
| 2,579,397 | Roetheli | Dec. 18, 1951 |
| 2,579,398 | Roetheli | Dec. 18, 1951 |
| 2,623,817 | Lewis | Dec. 30, 1952 |